US007930299B2

(12) United States Patent
Yuval et al.

(10) Patent No.: US 7,930,299 B2
(45) Date of Patent: *Apr. 19, 2011

(54) SYSTEM AND METHOD FOR APPENDING SECURITY INFORMATION TO SEARCH ENGINE RESULTS

(75) Inventors: Ben-Itzhak Yuval, Tel Aviv (IL); Elbaz Limor, New York, NY (US)

(73) Assignee: Finjan, Inc., San Jose, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 11/606,663

(22) Filed: Nov. 29, 2006

(65) Prior Publication Data

US 2007/0143270 A1     Jun. 21, 2007

Related U.S. Application Data

(60) Provisional application No. 60/740,663, filed on Nov. 30, 2005.

(51) Int. Cl.
G06F 7/00 (2006.01)
(52) U.S. Cl. ...................................................... 707/722
(58) Field of Classification Search ............... 707/3, 722
See application file for complete search history.

(56) References Cited

U.S. PATENT DOCUMENTS

| 6,092,194 | A | 7/2000 | Touboul | 726/24 |
| 6,721,721 | B1 * | 4/2004 | Bates et al. | 707/1 |
| 6,785,732 | B1 * | 8/2004 | Bates et al. | 709/232 |
| 6,804,780 | B1 | 10/2004 | Touboul | 713/181 |
| 2003/0097591 | A1 * | 5/2003 | Pham et al. | 713/201 |
| 2004/0148281 | A1 | 7/2004 | Bates et al. | 707/3 |
| 2004/0193870 | A1 | 9/2004 | Redlich et al. | 713/154 |
| 2005/0108554 | A1 | 5/2005 | Rubin et al. | 713/187 |
| 2006/0101514 | A1 * | 5/2006 | Milener et al. | 726/22 |
| 2007/0011739 | A1 * | 1/2007 | Zamir et al. | 726/22 |

(Continued)

FOREIGN PATENT DOCUMENTS

EP       1 672 515 A1     6/2006

OTHER PUBLICATIONS

International Search Report and Written Opinion for Application No. PCT/IL06/01385, dated Jul. 23, 2008.

(Continued)

Primary Examiner — Wilson Lee
Assistant Examiner — Michael Le
(74) Attorney, Agent, or Firm — Dawn-Marie Bey; King & Spalding LLP

(57) ABSTRACT

A system for appending security information to search engine results, including a search engine for locating, in a computer network, web pages that include at least one designated search term, for issuing a security analysis request to a content security scanner to assess at least one designated web page for potential security risks, and for preparing a search results summary that includes links to the located web pages and security assessments for the located web pages, a client computer communicatively coupled with the search engine for issuing a search request with at least one user designated search term, to the search engine, and for receiving the search results summary from the search engine, and a content security scanner communicatively coupled with the search engine for assessing security of content in at least one designated web page. A method and computer-readable storage media are also described and claimed.

21 Claims, 10 Drawing Sheets

U.S. PATENT DOCUMENTS

2007/0136811 A1  6/2007  Gruzman et al. ............... 726/24

OTHER PUBLICATIONS

Non-Final Office Action dated Sep. 17, 2008 for U.S. Appl. No. 11/606,707.

Response to Non-Final Office Action dated Sep. 17, 2008, filed Dec. 10, 2008, for U.S. Appl. No. 11/606,707.

Supplementary European Search Report for Application No. EP 06 82 1605, 6 pp., dated Jul. 6, 2009.

* cited by examiner

SYSTEM AND METHOD FOR APPENDING SECURITY INFORMATION TO SEARCH ENGINE RESULTS

CROSS REFERENCES TO RELATED APPLICATIONS

This application claims the benefit of priority from U.S. Provisional Application Ser. No. 60/740,663 entitled SYSTEM AND METHOD FOR APPENDING SECURITY INFORMATION TO SEARCH ENGINE RESULTS, filed on Nov. 30, 2005.

FIELD OF THE INVENTION

The present invention relates to computer security associated with identified search engine results.

BACKGROUND OF THE INVENTION

The Internet has grown and continues to grow dramatically, and the wealth of information available on the Internet is enormous. In order to take advantage of this wealth of information, a key enabler is a web search engine. A web search engine is a tool that enables a user to request a search for web pages or media such as songs, pictures and movies, on the Internet that contain designated search terms, and that responds by providing a summary with links to web pages thus found. Without a search engine, the Internet would be like a library with millions of books shelved in random order, and without an index system to reference them.

Today, very sophisticated and powerful search engines exist, such as the search engine of Google, Inc. of Mountain View, Calif., and the search engine of Yahoo!, Inc. of Sunnyvale, Calif., which enable a user to search millions of web pages for designated search terms, and media such as pictures, songs and movies, within seconds.

Because the Internet is a public network, there is no natural screening in place for content placed on the web. Instead, special screening tools such as content filters are used to filter out undesired content. One of the most vital filters is a content security filter, which blocks content containing viruses or other such malicious program code from being downloaded and wreaking havoc in a user's computer. Content security filters are described in Applicants' U.S. Pat. Nos. 6,092,194 and 6,804,780, both entitled SYSTEM AND METHOD FOR PROTECTING A COMPUTER AND A NETWORK FROM HOSTILE DOWNLOADABLES, pending U.S. Ser. No. 10/930,884, entitled METHOD AND SYSTEM FOR ADAPTIVE RULE-BASED CONTENT SCANNERS, and pending U.S. Ser. No. 11/298,475, entitled SYSTEM AND METHOD FOR INSPECTING DYNAMICALLY GENERATED EXECUTABLE CODE, all of which are incorporated by reference.

Like the Internet, conventional search engines have no natural screening in place, and the web pages and media located by a search engine in its search results may contain content that poses security risks. If a user does not have a security filter in place on his computer, then he may compromise his computer security by clicking on one of the links displayed in a search results summary. Even if the user does have a security filter in place, which blocks his computer from downloading unsafe content, he may still click on links to web pages with unsafe content, which are then blocked by his content filter. If his filter is not continually updated, then the filter may not be able to block all types of unsafe content. If his filter is continually updated, then the filter will block unsafe content, but the user will waste time clicking on links in search results that reference web pages or media with unsafe content, and then having these web pages or media blocked by the filter. This may waste, for example a few seconds of time for each unsafe link displayed in the search results. Given that users regularly sift through hundreds of search engine results on a daily basis, the waste of time is significant.

SUMMARY OF THE DESCRIPTION

The present invention relates to a system and method for combining operation of a search engine with operation of a content security filter, so as to provide security assessments for web pages or media content (collectively, web content) located by the search engine. Media content includes inter alia audio content for songs and speech, image content for pictures, video content for clips and movies, and content for animations, presentations and slide shows. In accordance with the present invention, a user can discern which links displayed in a search results summary reference potentially unsafe web pages and media, and thus refrain from clicking on such links. Moreover, systems operating in accordance with the present invention can be configured so as to eliminate potentially unsafe web pages and media from the search results summary, in which case only links to safe web pages and to safe media are displayed to the user in the summary.

Systems operating in accordance with the present invention can integrate a client computer with a web browser, a search engine with a web server, and a content security scanner, to append security assessments to search engine results. As used herein, appending refers to inclusion in any way as a part of search engine results, including, for example, in-line with individual search results or at the end of a group of results. This can be embodied in a wide variety of architectures that couple these components in different ways. In some embodiments of the present invention, a database manager can be used to store content inspection results in a database indexed by web page references, such as URLs. In these embodiments, security assessments can be retrieved directly from the database. Use of a database for storing security assessments enables content security scanning to be performed asynchronously, and not necessarily in real-time. Use of a database for storing security assessments also enables content security scanning to be performed pro-actively, and not necessarily reactively.

There is thus provided in accordance with an embodiment of the present invention a method for appending security information to search engine results, comprising issuing to a search engine a search request for web content having at least one designated search term, receiving from the search engine a search results report identifying web content that includes the designated search term, requesting assessment of the received search results for potential security risks, receiving an assessment indicating potential security risks, and displaying a search results summary that includes security assessments associated with the identified web content.

There is also provided in accordance with an embodiment of the present invention a system for appending security information to search engine results, comprising a client computer for issuing to a search engine a search request for web content having at least one designated search term, receiving from the search engine a search results report identifying web content that includes the designated search term, requesting assessment of the search results for potential security risks, receiving an assessment indicating potential security risks, and displaying a search results summary that includes security assessments associated with the identified web content, and a content security scanner communicatively coupled with the client computer for responding to the issued security analysis request to assess security associated with the item of web content.

There is also provided in accordance with an embodiment of the present invention a computer-readable storage media storing program code for causing a computing device to generate a search request with at least one designated search term, receive an identification of web content in a computer network that includes the at least one designated search term, request assessments of the identified web content for potential security risks, and generate a search results summary that incorporates security assessments for the identified web content.

There is also provided in accordance with an embodiment of the present invention a method for appending security information to search engine results, comprising issuing to a search engine a search request for web content having at least one designated search term, receiving from the search engine a search results report identifying web content that includes the designated search term and receiving an active program for retrieving security assessments for the identified web content, executing the active program to request assessment of the received search results for potential security risks, receiving an assessment indicating potential security risks, and displaying a search results summary that includes security assessments associated with the identified web content.

BRIEF DESCRIPTION OF THE DRAWINGS

The claimed invention will be more fully understood and appreciated from the following detailed description, taken in conjunction with the drawings in which:

DETAILED DESCRIPTION

The following discussion concerns computer network security and web search engines and more specifically, methods and systems for assessing security of web content referenced in search results. Web content includes web pages and media including, inter alia, audio content for songs and speech, image content for pictures, video content for clips and movies, and content for animations, presentations and slide shows.

Figure 1:
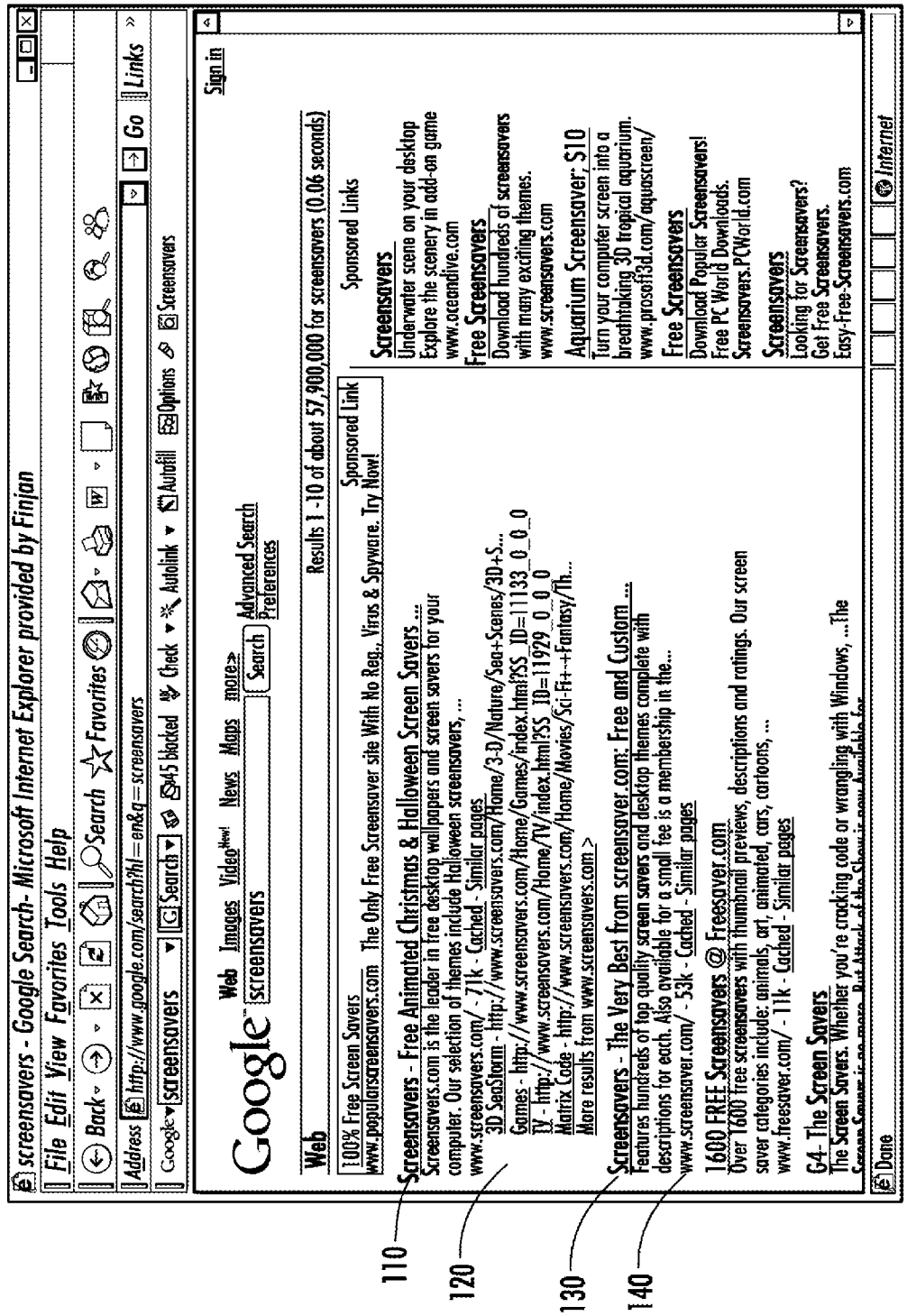
FIG. 1 is an illustration of a known display of search results.

Reference is now made to FIG. 1, which is an illustration of a known display of search results. The display shown in FIG. 1 was generated by querying a web search engine with the search term "screensavers". The specific search engine invoked is the well-known search engine of Google, Inc. of Mountain View, Calif. A summary of results is displayed in FIG. 1, the summary including links to web pages and descriptive text about the web pages. For example, the first link 110 points to www.screensavers.com and includes descriptive text 120 that reads "Screensavers.com is the leader in free desktop wallpapers and screen savers . . . ". The second link 130 points to www.screensaver.com and includes descriptive text 140 that reads "Features hundreds of top quality screensavers and desktop themes . . . ".

Figure 2:
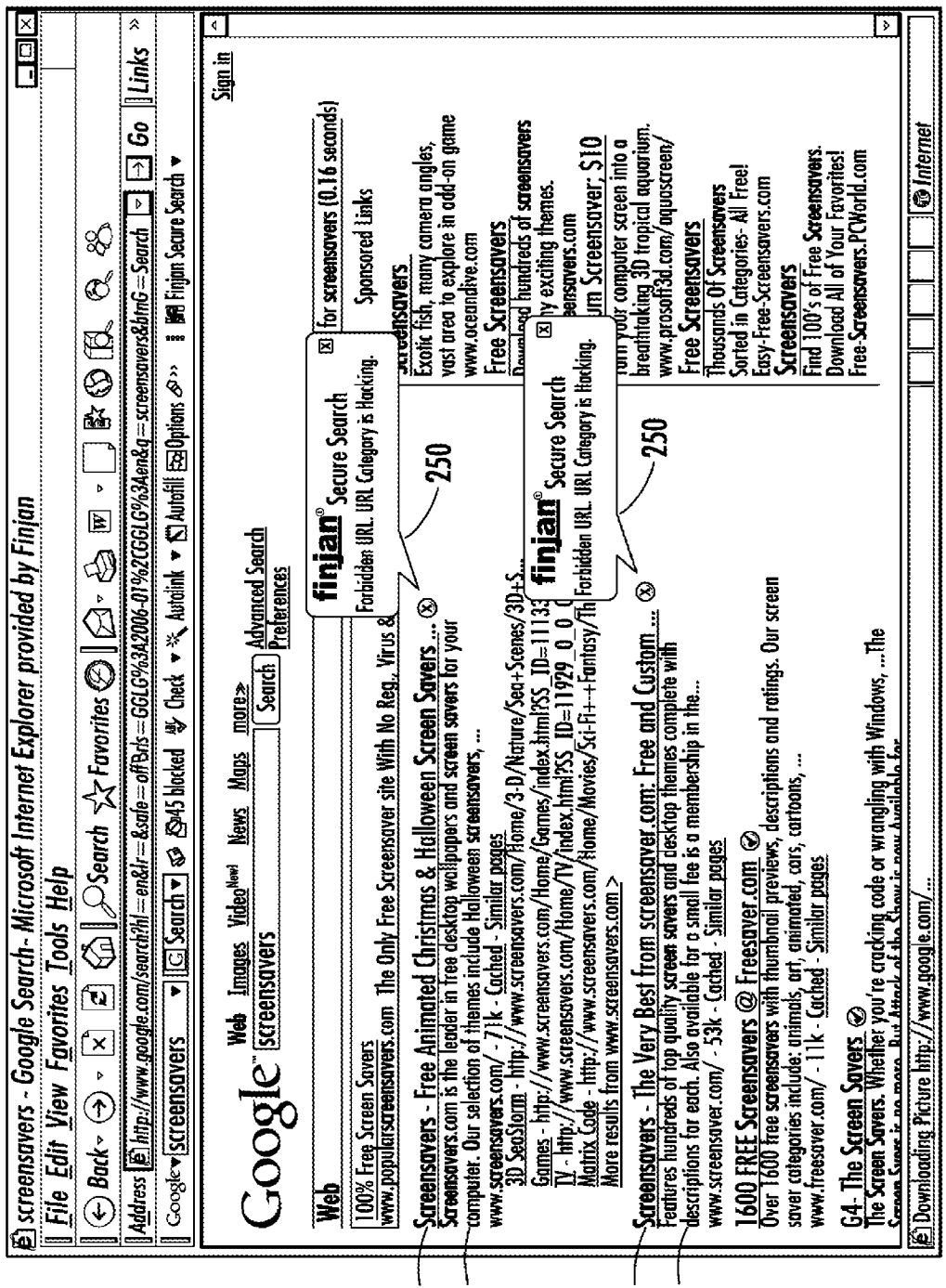
FIG. 2 is an illustration of a display of search results that appends security information, in accordance with an embodiment of the present invention.

Reference is now made to FIG. 2, which is an illustration of a display of search results that appends security information, in accordance with an embodiment of the present invention. The display shown in FIG. 2 was generated by querying a web search engine with the search term "screensavers". Links 210 and 230 and respective descriptive texts 220 and 240 appear, corresponding to the links and descriptive texts in FIG. 1. The search results in FIG. 2 are augmented with security information. Specifically, content in the web pages referenced by links 210 and 230 was inspected and found to have potential security risks. This is indicated in FIG. 2 by the augmented messages "Forbidden URL. URL Category is hacking." Such a message alerts a user to a potential spyware risk in following link 210 to the web page www.screensavers.com, or in following link 230 to the web page www.screensaver.com.

In accordance with an embodiment of the present invention, a user may configure various settings for display of search results. In one configuration, only links to safe web pages are displayed in the search results. Under this configuration links 210 and 230 and their respective descriptive texts 220 and 240 would be filtered out and not displayed altogether. In another configuration, links to safe and potentially unsafe web pages are displayed, but when the user tries to link to a potentially unsafe web page, a pop-up box with an alert message is displayed asking the user to confirm his selection, prior to browsing the unsafe web page. In another configuration, potentially unsafe web pages are displayed in a special color, such as bright red, or with a special icon, such as a skull & bones, to flag that they pose a potential security risk.

Figure 5:
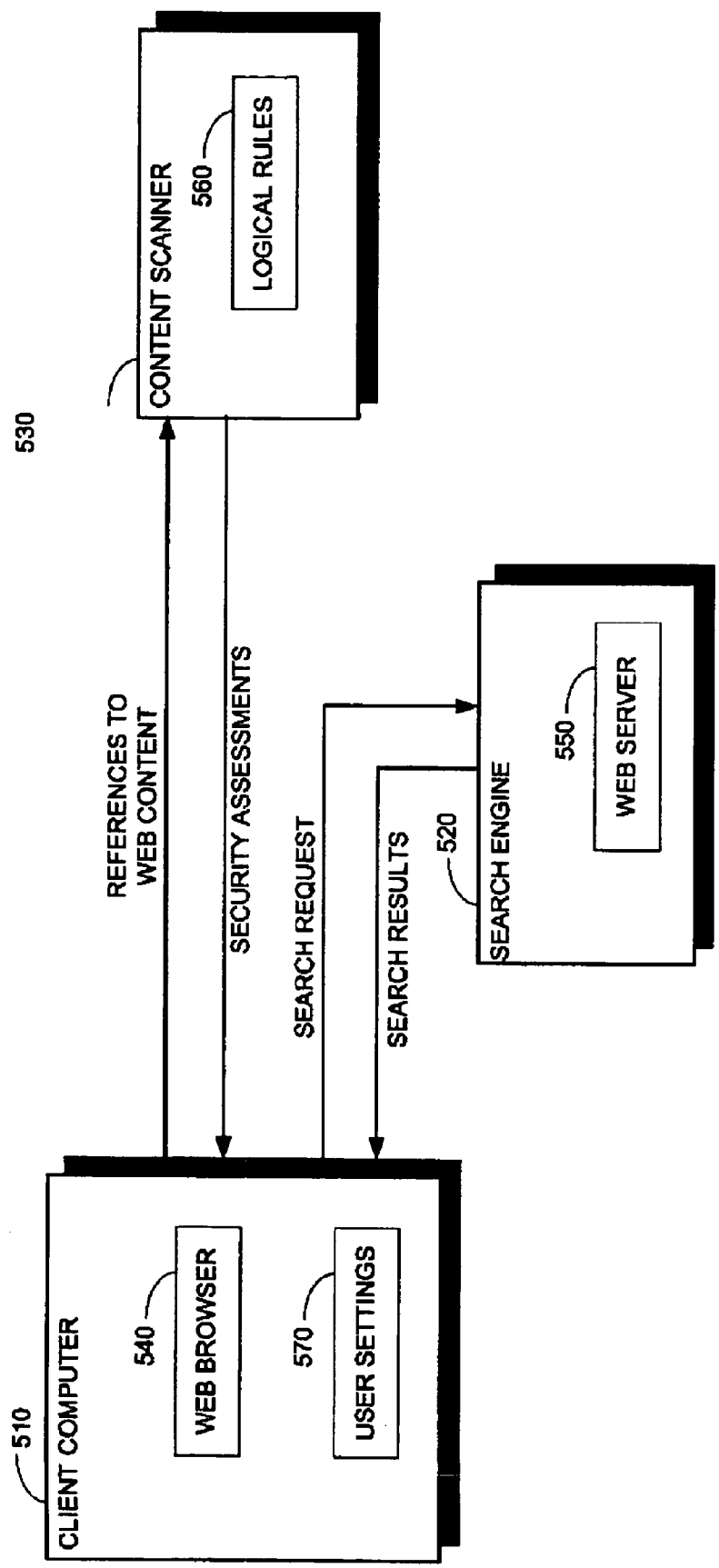
FIG. 5 is a simplified block diagram of a first client-side system for appending security information to search results, in accordance with an embodiment of the present invention.
Figure 6:
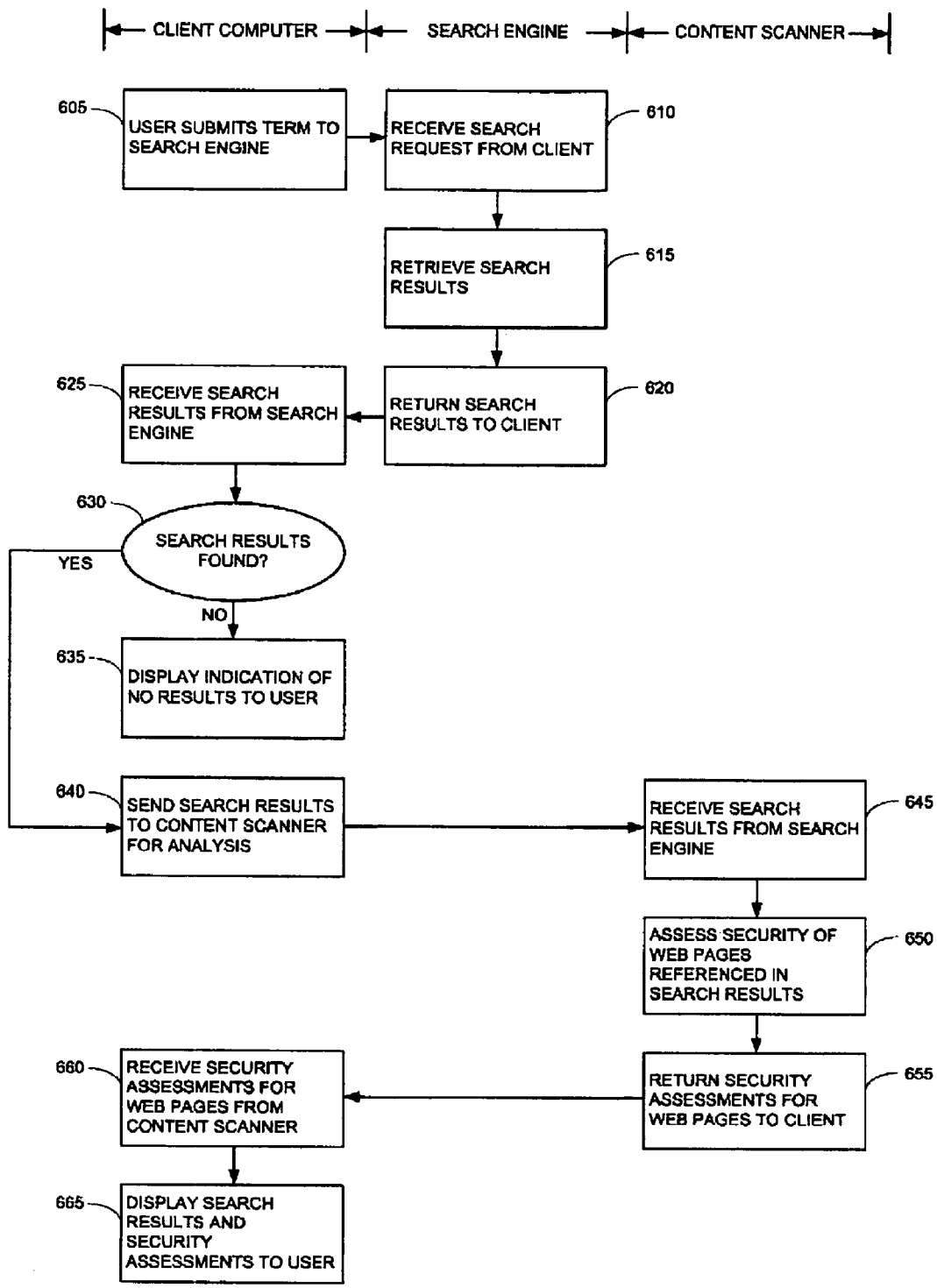
FIG. 6 is a simplified flow chart of a first client-side method for appending security information to search results, in accordance with an embodiment of the present invention.
Figure 7:
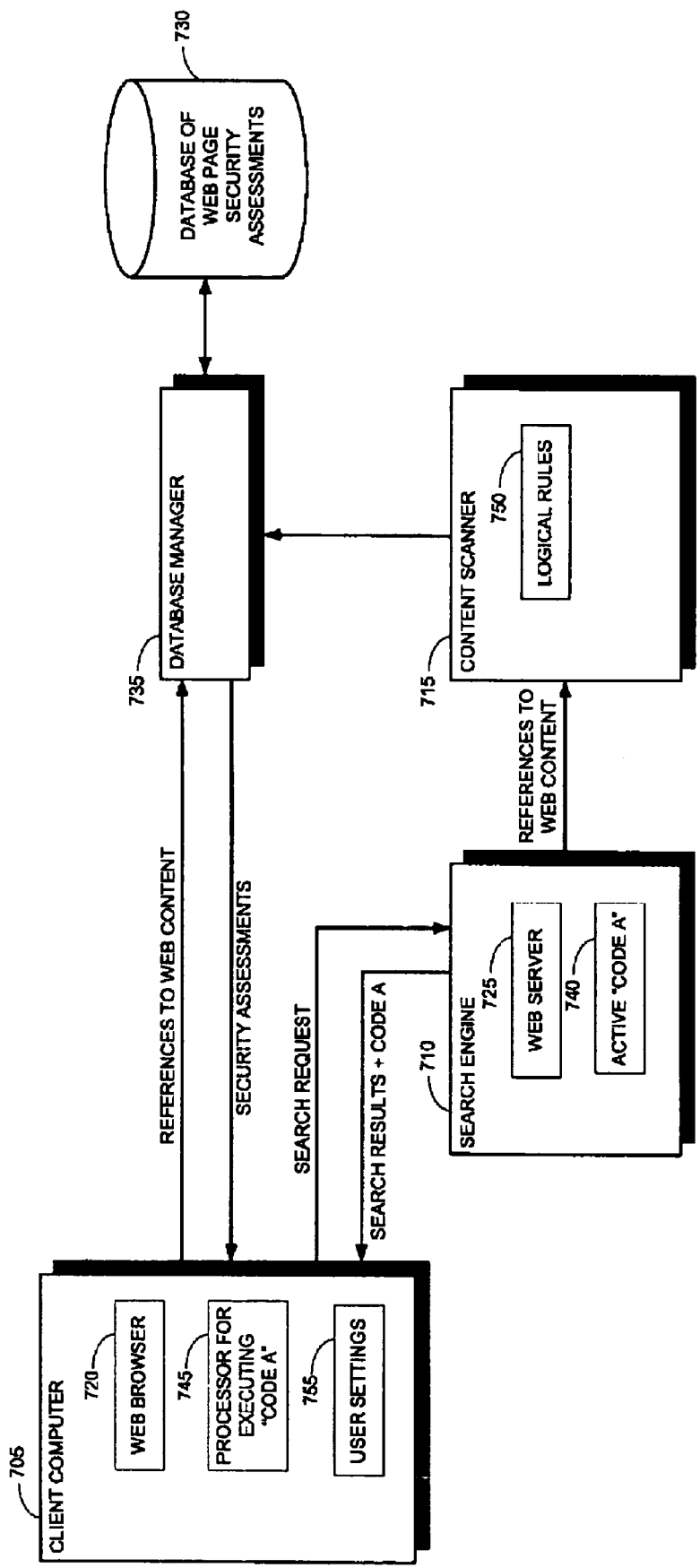
FIG. 7 is a simplified block diagram of a second client-side system, using active code, for appending security information to search results, in accordance with an embodiment of the present invention.
Figure 8:
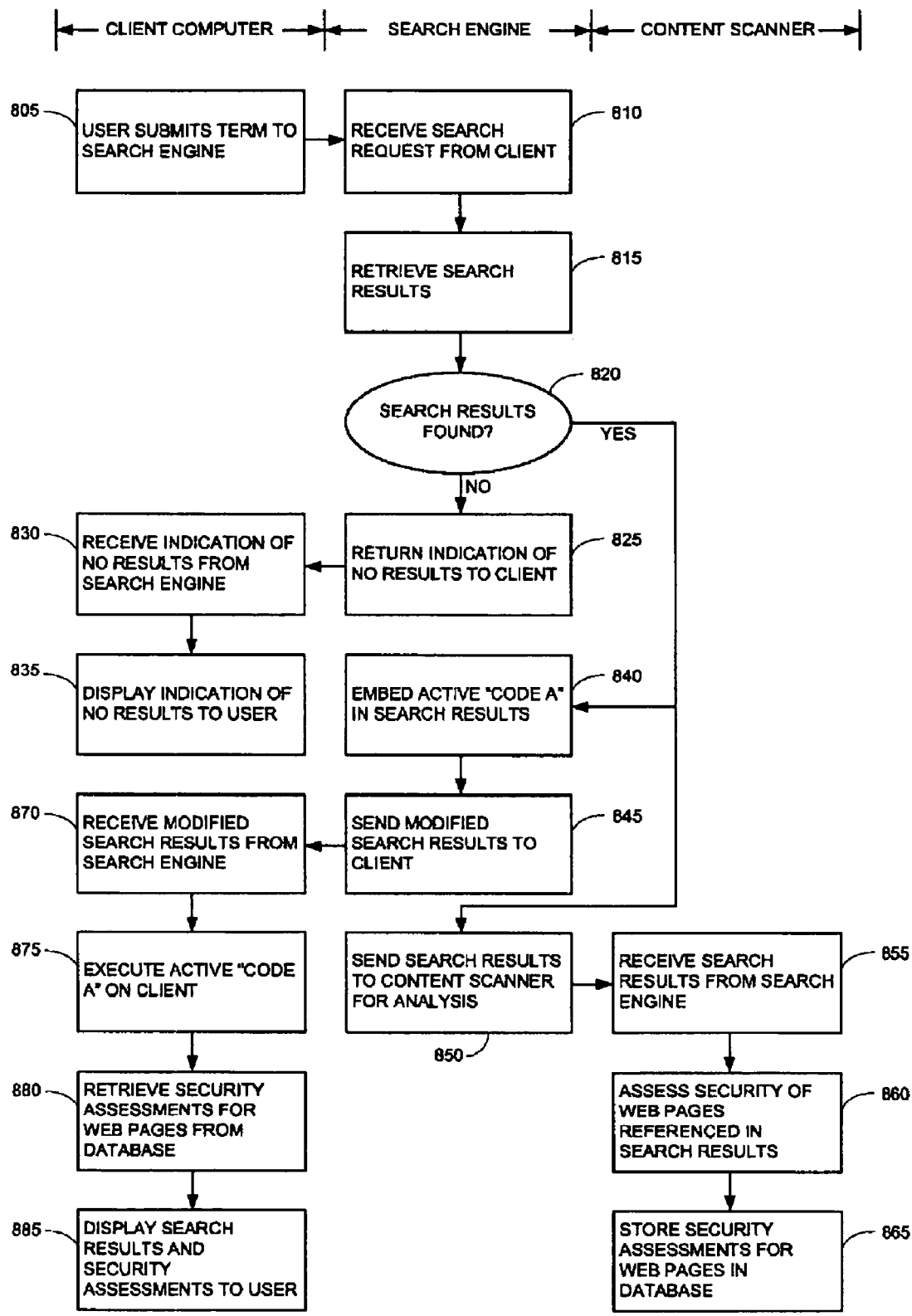
FIG. 8 is a simplified flow chart of a second client-side method, using active code, for appending security information to search results, in accordance with an embodiment of the present invention.

Aspects of the present invention may be implemented within a wide variety of computer software and hardware architectures. Three such architectures are provided in FIGS. 3-8. Specifically, FIGS. 3 and 4, described in detail herein below, illustrate a server-side architecture, where a search engine invoked by a client computer is augmented to further invoke a content security scanner and append security inspection results to its conventional search results. The thus appended search results are returned to the client computer for display. FIGS. 5 and 6, described in detail herein below, illustrate a client-side architecture, where a conventional search engine is invoked, and a client computer is augmented, perhaps in an installed web browser, to invoke the content security scanner and display the security inspection results. FIGS. 7 and 8, described in detail herein below, illustrate a different client-side architecture, where the content security scanner stores its inspection results in a database indexed by web page URLs, and the client computer retrieves inspection results for the web pages located by the search engine.

Figure 3:
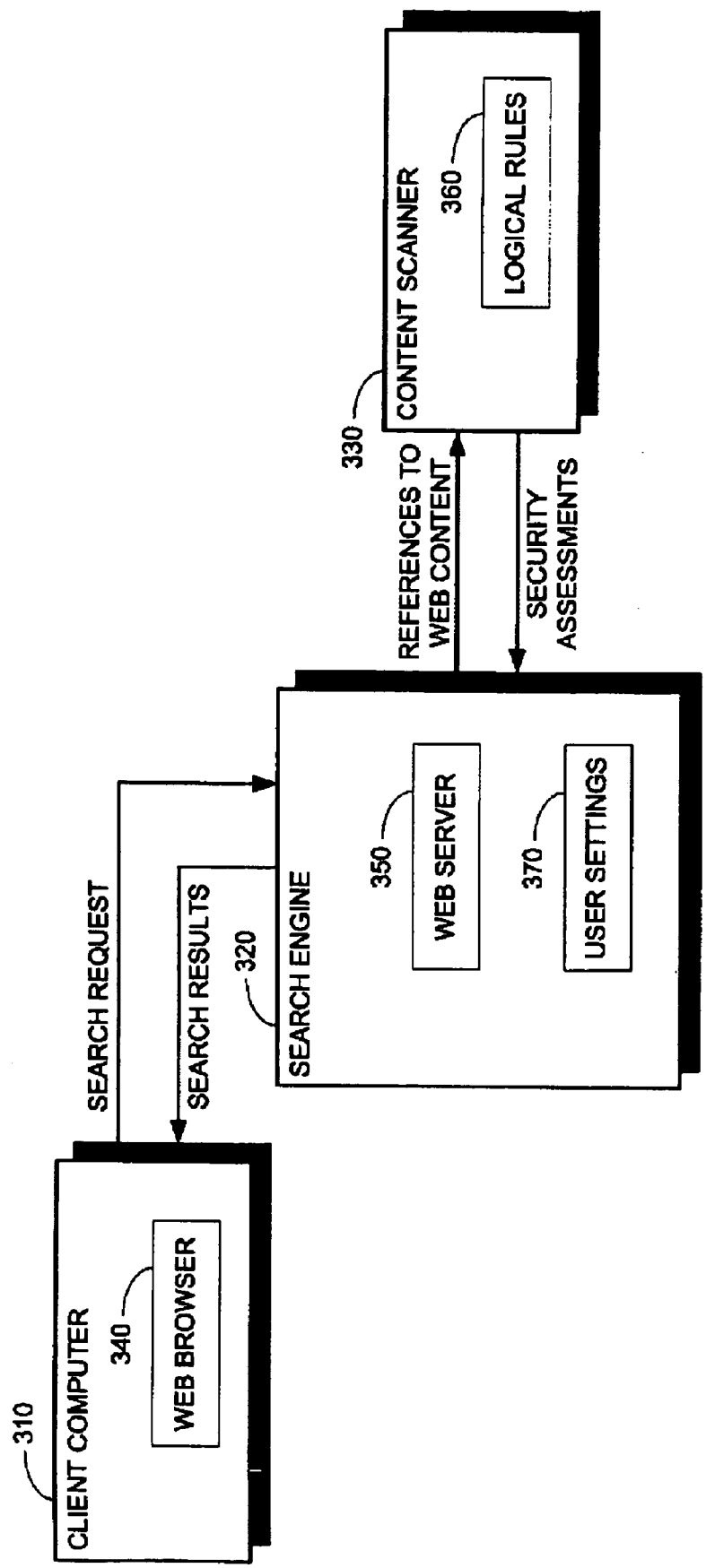
FIG. 3 is a simplified block diagram of a server-side system for appending security information to search results, in accordance with an embodiment of the present invention.

Reference is now made to FIG. 3, which is a simplified block diagram of a server-side system for appending security information to search results, in accordance with an embodiment of the present invention. Shown in FIG. 3 are three primary components; namely, a client computer 310, a search engine 320 and a content scanner 330. Client computer 310 includes a web browser 340, which enables a user of client computer 310 to retrieve and display web pages and media from a computer network such as the Internet. In order to locate desired web pages and media, the user of client computer 310 can issue a search request with designated search terms to search engine 320.

Search engine 320 includes a web server 350, which serves web pages and media to client computers. Search engine 320 receives as input one or more search terms, searches the computer network, or a pre-populated database, locates web pages and media that include the user's designated search terms, and prepares as output a search results report that includes links to the located web pages and media, such as the search results report shown in FIG. 1. Content scanner 330 receives as input one or more designated web pages or pieces of media content, and conducts a security analysis of content in the designated web pages or designated media, to detect the presence of potentially malicious code that could damage or compromise the security of client computer 310, and prepares as output a security assessment for each of the designated web pages or pieces of media content.

In accordance with an embodiment of the present invention, search engine 320 issues a request for content scanner 330 to scan the content in the web pages and media located by search engine 320, for the presence of potentially malicious code that could damage or compromise the security of client computer 310. In turn, content scanner 330 responds to search engine 320 with a security assessment for each of the web pages and pieces of media content. In preparing the search results report, search engine 320 combines the security assessments together with the links to the located web pages and media, to produce an enhanced report such as the search results report shown in FIG. 2. The enhanced search results report is sent to client computer 310, and displayed to the user of client computer 310 who initiated the search request.

In accordance with an embodiment of the present invention, content security scanner 330 uses logical rules 360 to perform its inspection of web page content and media content. Logical rules 360 may be used to define the security breaches that content security scanner 330 checks for. For example, logical rules 360 may prescribe that content security scanner 330 should check for detection of potential file system breaches, network connection breaches and spying activity in the content it scans.

Further in accordance with an embodiment of the present invention, search engine 320 includes user settings 370 for governing how security assessments are used, and for configuring a search results report based on inspection results received from content scanner 330. The search results report may be configured to filter out web pages that are determined to include potentially malicious content. The search results report may be configured to list potentially unsafe web pages but to block their access, or to conditionally block their access pending confirmation from a user. User settings 370 can be entered by users connected to search engine 320, and may be persisted in a web browser 340 cookie file on client computer 310 for subsequent retrieval.

Security assessments received from content scanner 330 may be cached in search engine 320 for subsequent retrieval, thereby obviating the need to send links to the same web pages and media from search engine 320 to content scanner 330 for re-scanning.

If appropriate, some web sites may be listed in a "white list" of web sites known to be safe. The "white list" is stored on search engine 320 or on content scanner 330 or on both, so that references to web pages and content on such sites do not need to be scanned for potential security violations. Alternatively, the "white list" may be stored on client computer 310 and transmitted to search engine 320 when they are connected.

Figure 4:
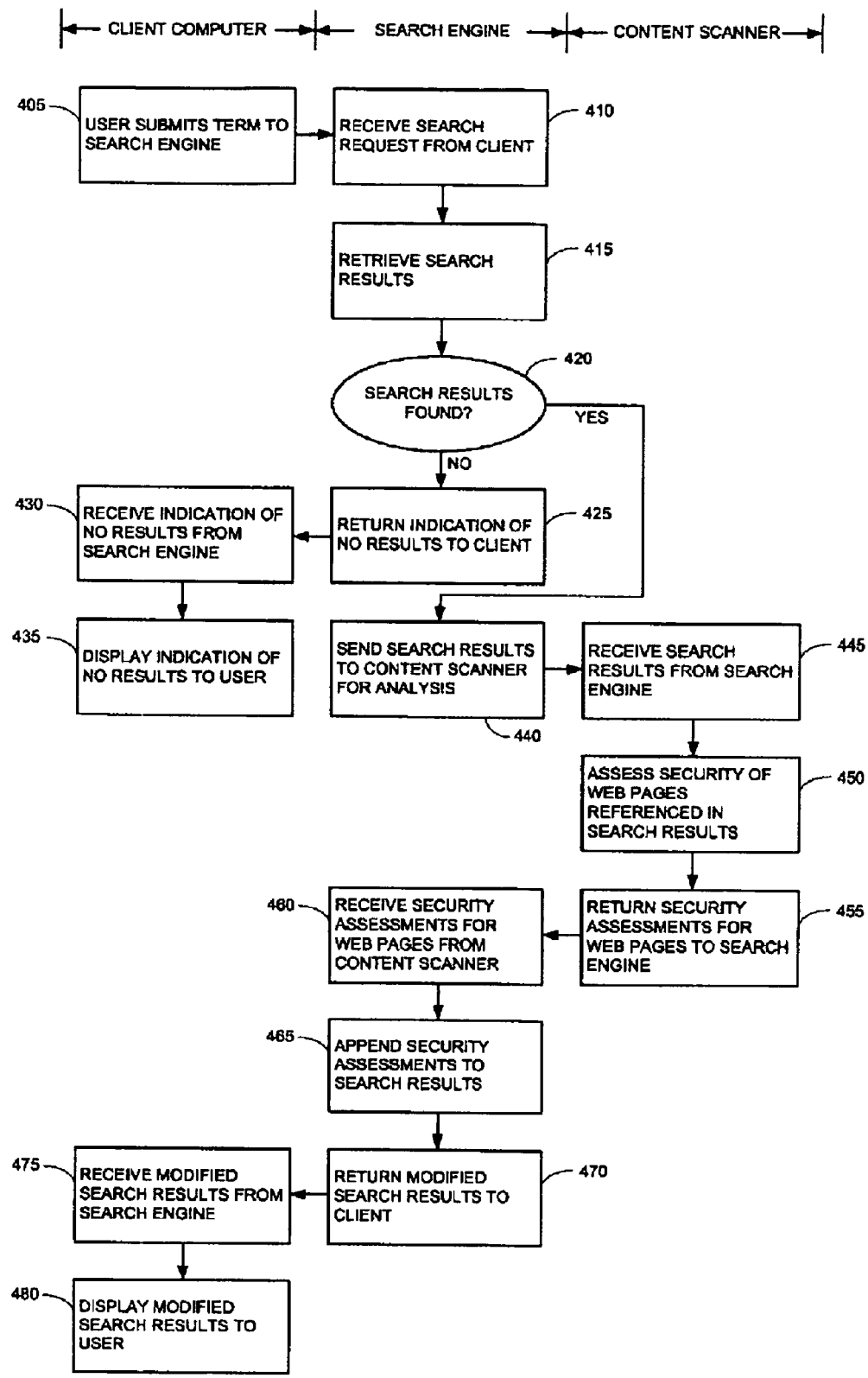
FIG. 4 is a simplified flow chart of a server-side method for appending security information to search results, in accordance with an embodiment of the present invention.

Reference is now made to FIG. 4, which is a simplified flow chart of a server-side method for appending security information to search results, in accordance with an embodiment of the present invention. The flow chart of FIG. 4 is divided into three columns. The leftmost column indicates steps performed by a client computer, such as client computer 310 (FIG. 3). The middle column indicates steps performed by a search engine, such as search engine 320. The rightmost column indicates steps performed by a content scanner, such as content scanner 330.

At step 405 a user of the client computer submits a search request to the search engine, including one or more designated search terms. At step 410 the search engine receives the search request from the client computer. At step 415 the search engine retrieves the desired search results by locating web pages and media that include the designated search terms. Generally, the search engine locates the web pages and media from a pre-populated database, rather than by real-time web searching. At step 420 a determination is made as to whether or not any such web pages or media were located. If not, then at step 425 the search engine returns to the client computer an indicator that no results were found. At step 430 the client computer receives the indicator and at step 435 the client computer displays a page indicating to the user that no results were found.

Otherwise, if it is determined at step 420 that search results were found, then at step 440 the search engine sends links to the web pages and media it located to the content scanner for inspection. At step 445 the content scanner receives links to the web pages and media located in the search, and at step 450 the content scanner assesses the security of content in the located web pages and media. At step 455, the content scanner returns assessments for the located web pages and media to the search engine. It will be appreciated that the content scanner may also record the assessments in a log file, for post-analysis and post-processing.

At step 460 the search engine receives the security assessments from the content scanner, and at step 465 the search engine appends the security assessments in its summary search results report. Thus, the search results report contains both links to the located web pages and media, and security assessments for the located web pages and media. At step 470 the search engine sends its modified search results report, with the appended security assessments, to the client computer. It will be appreciated that the search engine may also record the assessments in a log file, for post-analysis and post-processing.

At step 475 the client computer receives the modified search results report, and at step 480 the client computer displays the modified search results report to the user who initiated the search request. It will be appreciated that the client computer may also record the assessments in a log file, for subsequent review by the user, and for post-analysis and post-processing.

Referring to step 440, while all of the search results may be sent to the content scanner for analysis, in a further embodiment, only those search results that will be presented to the user on a first page of search result links are initially sent for analysis. If the user selects to receive additional web pages containing additional search results, those search results are then sent for analysis once the corresponding search results page is requested. By incrementally sending search results to the content scanner, unnecessary content scanning is reduced, resulting in a more efficient system.

In an alternative embodiment of the present invention, the search engine sends the unmodified search results, without the security assessments appended, to the client computer, prior to step 440, before the search engine receives the security assessments from the content scanner. At step 470, after receiving the security assessments from the content scanner, the search engine sends the modified search results, with the security assessments appended, to the client computer. In turn, the client computer updates the search results based on the security assessments.

This alternative embodiment eliminates the latency of scanning content in the located web pages and media. It enables a user of the client computer to access the located web pages and media immediately after the search engine locates these pages and pieces of media content, and before the security assessments are available, albeit at the user's risk. During the stage when the client computer displays the unmodified search results before receiving the security assessments, the client computer may display a notice indicating to the user that the client computer is awaiting the security assessments. Such a notice may be of the form "(Checking for malicious content . . . )".

Reference is now made to FIG. 5, which is a simplified block diagram of a first client-side system for appending security information to search results, in accordance with an embodiment of the present invention. The system shown in FIG. 5 has primary components which are similar to the three components shown in FIG. 3; namely, a client computer 510, a search engine 520 and a content scanner 530. However, in FIG. 5 client computer 510 interacts directly with content scanner 530, whereas in FIG. 3 the search engine interacted directly with the content scanner. Client computer 510 includes web browser software 540, and search engine 520 includes web server software 550.

A user of client computer 510 submits a search request to search engine 520 with search terms designated by the user. Search engine 520 behaves like a conventional search engine, which receives as input a search request with one or more designated search terms, searches a computer network or a pre-populated database, locates web pages and media that include the designated search terms, and prepares a search results summary report with links to the located web pages and media, which it returns as output to client computer 510. Content scanner 530 receives as input links to one or more designated web pages and pieces of media content, and scans the content in the designated web pages and media to detect the presence of potentially malicious program code. Content scanner 530 returns as output security assessments for the designated web pages and media.

After receiving the search results report from search engine 520, client computer 510 issues a request to content scanner 530 to scan the web pages and media referenced in the search results report, for the presence of potentially malicious program code. Content scanner 530 produces security assessments for content in the web pages and media, indicating the presence or non-presence of potential security risks. Client computer 510 receives the security assessments from content scanner 530 and displays the search results with links to the located web pages and media, together with the security assessments for the located web pages and media, to the user of client computer 510 who initiated the search request.

Content scanner 530 may include logical rules 560 that govern how it inspects web content. Client computer 510 may include user settings 570 that govern how security assessments are used, and how search results reports are configured. User settings 570 can be entered by a user of client computer 510 and saved for subsequent use.

Security assessments received from content scanner 530 may be cached in client computer 510 for subsequent retrieval, thereby obviating the need to send links to the same web pages and media from client computer 510 to content scanner 530 for re-scanning.

If appropriate, some web sites may be listed in a "white list" of web sites known to be safe. The "white" list is stored on client computer 510 or on content scanner 530 or on both, so that references to web pages and content on such sites do not need to be scanned for potential security violations.

It may be appreciated by those skilled in the art that the system of FIG. 5 differs from the system of FIG. 3 regarding the component that interacts with the content security scanner. In the server-side system of FIG. 3, the search engine communicates with the content security scanner and combines the security assessments with the search results report. In the client-side system of FIG. 5, the search engine behaves like a conventional search engine, and the client computer communicates with the content security scanner.

Reference is now made to FIG. 6, which is a simplified flow chart of a first client-side method for appending security information to search results, in accordance with an embodiment of the present invention. As with FIG. 4, the flow chart of FIG. 6 is divided into three columns, a left column indicating steps performed by a client computer, a middle column indicating steps performed by a search engine, and a right column indicating steps performed by a content scanner.

At step 605 a user of the client computer submits a search request to the search engine, with one or more search terms designated by the user. At step 610 the search engine receives the user's search request, and at step 615 the search engine retrieves the desired search results by locating web pages and media that include the designated search terms. Generally, the search engine locates the web pages and media from a pre-populated database, rather than by real-time web searching. The search engine prepares a summary search results report with links to the located web pages and media, and at step 620 it sends the search results to the client computer.

At step 625 the client computer receives the search results from the search engine, and at step 630 a determination is made as to whether or not any results were found. If not, then at step 635 the client computer displays a page indicating to the user that no results were found. Otherwise, if results were found, then processing proceeds from step 630 to step 640, where the client computer sends the search results report to the content scanner for security inspection. At step 645 the content scanner receives the search results, and at step 650 the content scanner analyzes content in the located web pages and media for the presence of potentially malicious content. The content scanner derives a security assessment for the located web pages and media, indicating the presence or non-presence of potential security risks. It will be appreciated that the content scanner may also record the assessments in a log file, for post-analysis and post-processing.

At step 655 the content scanner returns the security assessments for the located web pages to the client computer. At step 660 the client computer receives the security assessments, and at step 665 the client computer displays the search results and the security assessments to the user who initiated the search request. Thus the user can view links to the located web pages and media, and security assessments for the located web pages and media. It will be appreciated that the client computer may also record the assessments in a log file, for subsequent review by the user, and for post-analysis and post-processing.

Reference is now made to FIG. 7, which is a simplified block diagram of a second client-side system, using active code, for appending security information to search results, in accordance with an embodiment of the present invention. Shown in FIG. 7 are three primary components; namely, a client computer 705, a search engine 710 and a content security scanner 715. Client computer 705 includes web browser software 720, and search engine 710 includes web server software 725.

A user of client computer 705 issues a search request to search engine 710 with one or more designated search terms. Search engine 710 receives as input a search request with one or more designated search terms, searches a computer network or a pre-populated database, locates web pages and media on the Internet that include the one or more designated search terms, and produces a summary search results report with links to the located web pages and media. In addition, search engine 710 appends active program code 740 as described herein below, to the search results report, and returns the thus appended report to client computer 705 as output. Content scanner 715 receives as input one or more designated web pages and pieces of media content, scans content in the designated web pages and media to generate security assessments for the web pages and media, and stores the security assessments in a database 730 controlled by a database manager 735. Database 730 stores records of security assessments for content in web pages and media, and is indexed by web page and media references. That is, security assessment for one or more web pages and pieces of media content may be retrieved from database 730 by querying the database based on a web page reference, such as a web page uniform resource locator (URL).

In accordance with an embodiment of the present invention, active program code is program code that is automatically executed by web browser 720, including inter alia Javascript program code and VB script program code. Active program code is generally embedded in a reply message from search engine 710 to client computer 705. When executed by web browser 720, active program code queries database 730 to retrieve security assessments for one or more designated web pages and pieces of media, receives the query results, and embeds them in the search results report.

A user of client computer 705 issues a search request to search engine 710, with one or more user designated search terms. Search engine 710 conducts the search and locates one or more web pages and pieces of media content that include the designated search terms. Search engine 710 prepares a search results report that includes links to the located web pages and media, and also appends active program code 740 to the search results report. The thus appended search results report is returned to client computer 705.

Search engine 710 also issues a request to content scanner 715 to analyze content in the located web pages and media for potential security risks. In turn, content scanner 715 scans the content in the located web pages and media, inspects the content for the presence of potentially malicious code, and stores the inspection results in database 730.

When web browser 720 receives the search results report from search engine 710, it launches a processor 745 for executing active program code. Processor 745 may be a special purpose processor, or a conventional computer CPU. As mentioned hereinabove, active program code 740 is programmed to query database manager 735 to retrieve from database 730 security assessments for one or more designated web pages and pieces of media content; namely, the web pages and media located by search engine 710. After client computer 705 receives the requested security assessments, it displays links to the located web pages and media, and security assessments for the located web pages and media, to the user of client computer 705 who initiated the search request.

Content scanner 715 may include logical rules 750 that govern how it inspects web content. Client computer 705 may include user settings 755 that govern how security assessments are used, and how search results reports are configured. User settings 755 can be entered by a user of client computer 705 and saved for subsequent use.

Security assessments received from database 730 may be cached in client computer 705 for subsequent retrieval, thereby obviating the need to send links to the same web pages and media from client computer 705 to database manager 735 for retrieval of their security assessments a second time.

If appropriate, some web sites may be listed in a "white list" of web sites known to be safe. The "white list" is stored on a client computer 705 or on search engine 710 or on content scanner 715 or on two or on all three of them, so that references to web pages and content on such sites do not need to be scanned for potential security violations.

It will be appreciated by those skilled in the art that the system shown in FIG. 7 differs from the system shown in FIG. 5 regarding the client computer module. In FIG. 5 the client module invokes the content scanner, whereas in FIG. 7 the search engine invokes the content scanner and the client module retrieves the inspection results form the database. Use of database 730 for storing security assessments enables content security scanning to be performed asynchronously, and not necessarily in real-time. Use of database 730 for storing security assessments also enables content security scanning to be performed pro-actively, and not necessarily reactively.

It will further be appreciated by those skilled in the art that the present invention may be implemented in many system architectures in addition to those shown in FIGS. 3, 5 and 7. Thus, inter alia, the search engine may interact directly with the database manager; the content scanner may be incorporated directly within the search engine; the content scanner may be incorporated directly within the client computer; and in fact all three components, the client computer, the search engine and the content scanner, may reside within the same computer hardware.

Reference is now made to FIG. 8, which is a simplified flow chart of a second client-side method, using active code, for appending security information to search results, in accordance with an embodiment of the present invention. FIG. 8 is divided into three columns, the left column including steps performed by a client computer, the middle column including steps performed by a search engine, and the right column including steps performed by a content security scanner.

At step 805 a user of the client computer submits a search request to the search engine with one or more designated search terms. At step 810 the search engine receives the user's search request, and at step 815 the search engine retrieves the desired search results by locating web pages and media that include the designated search terms. Generally, the search engine locates the web pages and media from a pre-populated database, rather than by real-time web scanning. At step 820 a determination is made as to whether or not any such web pages and media were located. If not, then at step 825 the search engine returns to the client computer an indication that no search results were found. At step 830 the client computer receives the indication, and at step 835 the client computer displays to the user a page indicating that no results were found.

Otherwise, if the search engine did locate web pages with the designated search terms, then processing proceeds from step 820 to steps 840 and 850. At step 840 the search engine embeds active program code, denoted by "Code A" and described hereinabove with reference to FIG. 7, into a search results report, and at step 845 the search engine sends the thus modified search results report to the client computer.

At step 850 the search engine sends a request to the content scanner for security analysis of the web pages and media that it located in its search. At step 860 the content scanner receives the security analysis request from the search engine, and inspects content in the web pages and media, and derives security assessments for the web pages and media. At step 865 the content scanner stores the security assessments in a database. The database is indexed by references, such as URLs, to web pages and media, and stores records of security assessments for each indexed web page and piece of media content. It will be appreciated that the content scanner may also record the assessments in a log file, for post-analysis and post-processing.

At step 870 the client computer receives the modified search results report sent to it by the search engine at step 845, the search results report including the embedded active program code. At step 875 the client computer executes the active program code, which is programmed to retrieve security assessments for designated web pages and pieces of media content from the database. Specifically, at step 880 the client computer, under instructions by the active program code, retrieves security assessments for the web pages and media referenced in the search results report. At step 885 the client computer displays links to the located web pages and media, and security assessments for the located web pages and media, to the user who initiated the search request. It will be appreciated that the client computer may also record the assessments in a log file, for subsequent review and for post-analysis and post-processing.

In reading the above description, persons skilled in the art will realize that there are many apparent variations that can be applied to the methods and systems described. Thus it will be appreciated that the present invention applies to a wide variety of client computing devices, including mobile devices and wireless devices, such as inter alia laptop computers, notebook computers, personal data assistants (PDAs), and cellular telephones.

Figure 9:
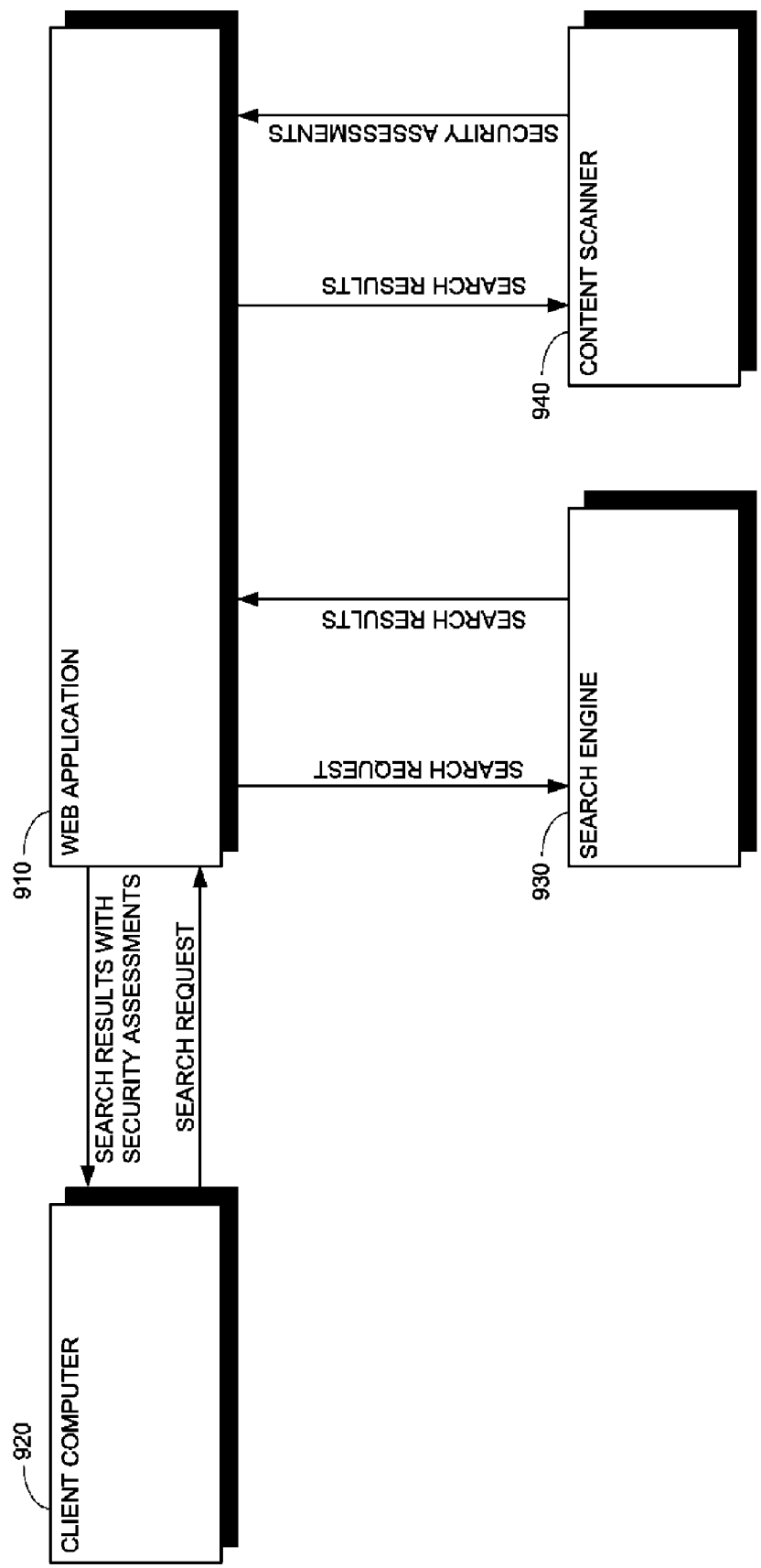
FIG. 9 is a simplified block diagram of a system for appending security information to search results, using a web application, in accordance with an alternative embodiment of the present invention.

In the system and method described in FIGS. 3 and 4, a user of a client computer submits a search request directly to a search engine. It will be appreciated by those skilled in the art that, in an alternative embodiment, the user may submit the search request to a web application, which in turn (i) submits the user's search request to a search engine, and (ii) submits the search results to a content scanner for security assessment. Reference is now made to FIG. 9, which is a simplified block diagram of such a system architecture.

Shown in FIG. 9 is a web application 910, which receives as input a search request from a user of client computer 920, the search request including one or more designated search terms, and returns as output search results including references to web pages and media that contain the user's search terms, together with security assessments for the referenced web pages and media. Web application 910 operates by submitting the user's search request to search engine 930, and receiving from search engine 930 search results in the form of references to web pages and media that contain the user's search terms. In turn, web application 910 submits the search results to content scanner 940, and receives from content scanner 940 security assessments for the located web pages and media. Web application 910 returns to client computer 920 a report that combines both the search results and the security assessments.

Figure 10:
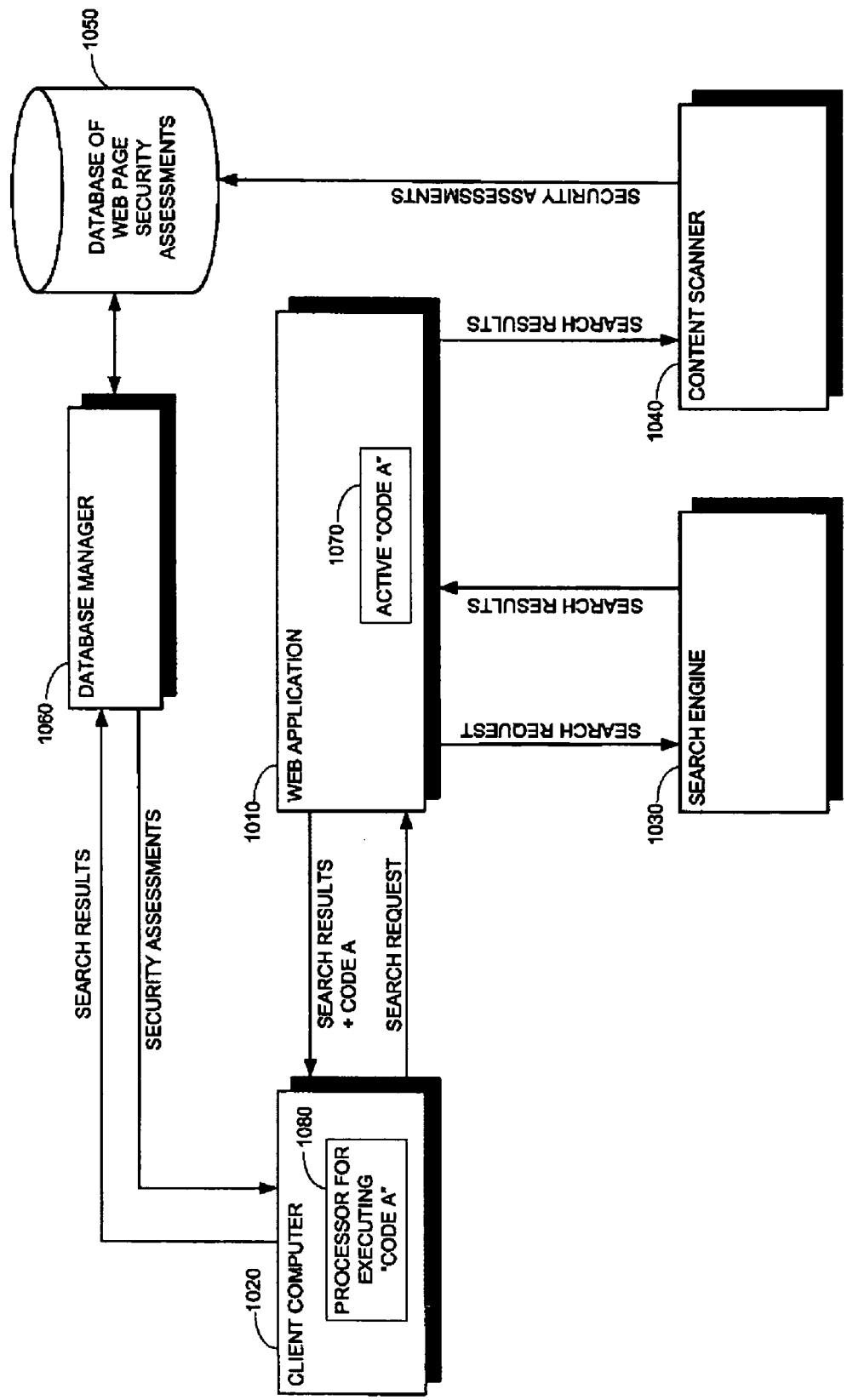
FIG. 10 is a simplified block diagram of a system for appending security information to search results, using a web application and using a database management system, in accordance with an alternative embodiment of the present invention.

Similarly, the architecture of the system in FIG. 7 may alternatively be embodied using a web application. Reference is now made to FIG. 10, which is a simplified block diagram of such a system. Shown in FIG. 10 is a web application 1010, which receives as input a search request from a user of client computer 1020, the search request including one or more designated search terms, and returns as output search results including references to web pages and media that contain the user's search terms, together with active program code 1070, denoted "Code A". Web application 1010 operates by submitting the user's search request to search engine 1030, and receiving from search engine 1030 search results in the form of references to web pages and media that contain the user's search terms. In turn, web application 1010 submits the search results to content scanner 1040.

Content scanner derives security assessments for web pages and media, and stores the results in a database 1050 indexed by references to web pages and media. Database 1050 is managed by a database manager 1060. When client computer 1020 receives the active program code, a processor 1080 automatically executes the active program code. The active program code is programmed to send one or more queries, regarding the references web pages and media, to database manager 1060, which retrieves the security assessments for the referenced web pages and media, and sends them as query response to client computer 1020. Client computer 1020 then prepares a report that combines both the search results and the security assessments, and displays the report to the user who submitted the search request, so that the user can identify the web pages and media in the search results together with assessments of potential security risks for content in these web pages and media.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for appending security information to search engine results, comprising:

issuing to a search engine a search request for web content, the search request having at least one designated search term;

receiving from the search engine search results identifying web content that includes the at least one designated search term;

generating a search results summary that presents the identified web content;

issuing to a content scanner a request for assessment of at least a portion of the identified web content, for potential security risks;

receiving from the content scanner assessments of potential security risks of the at least a portion of the identified web content; and dynamically generating a combined search and security results summary comprising:
  presenting the at least a portion of the identified web content, subsequent to said generating a search results summary and prior to completion of said receiving from the content scanner;
  dynamically updating the combined search and security results summary, comprising presenting potential security risks of the presented web content, after the assessments of potential security risks are received from the content scanner; and
  displaying a warning of potential risk, subsequent to said presenting and prior to said dynamically updating.

2. The method of claim 1, wherein the combined search and security results summary is dynamically generated according to user configuration information.

3. The method of claim 1, wherein the combined search and security results summary presents links to web content assessed to have potential security risks in a different color than links to web content assessed not to have potential security risks.

4. The method of claim 1, wherein the combined search and security results summary presents special icons adjacent to links to web content assessed to have potential security risks.

5. The method of claim 1, wherein the combined search and security results summary includes links to identified web content assessed not to have potential security risks.

6. The method of claim 5, wherein said dynamically generating a combined search and security results summary comprises filtering web content assessed to have potential security risks from being included in the combined search and security results summary.

7. The method of claim 1, wherein web content comprises web pages.

8. The method of claim 1, wherein web content comprises media content, which includes at least one of the group consisting of an audio file comprising a song, an audio file comprising speech, an image file comprising a picture, a video file comprising a video clip, a video file comprising a movie, a file comprising an animation, a file comprising a presentation, and a file comprising a slide show.

9. The method of claim 1, further comprising storing information pertaining to the received security assessment in a cache.

10. The method of claim 1, further comprising checking the at least a portion of the identified web content against a list of web content known to have a low security risk.

11. The method of claim 10, wherein said issuing a request for assessment is not performed for identified web content that is found in the list of web content known to have a low security risk.

12. The method of claim 1, wherein, in response to a user request for additional search results, additional assessments are requested from the content scanner for additional identified web content, and an additional combined search and security results summary is dynamically generated.

13. A system for appending security information to search engine results, comprising:
  a client computer (i) that issues to a search engine a search request for web content having at least one designated search term, (ii) that receives from the search engine search results identifying web content that includes the at least one designated search term, (iii) that generates a search results summary that presents the identified web content, (iv) that issues to a content scanner a request for assessment of potential security risks of at least a portion of the identified web content, (v) that receives from the content scanner assessments of potential security risks of the at least a portion of the identified web content, (vi) that dynamically generates a combined search and security results summary that presents the at least a portion of the identified web content, while some of the assessments of potential security risks have not yet been received from the content scanner, (vii) that dynamically updates the combined search and security results summary, by presenting potential security risks of the presented web content, after the assessments of potential security risks are received from the content scanner, and (viii) that displays a warning of potential risk, subsequent to presenting the at least a portion of the identified web content and prior to dynamically updating the combined search and security results summary; and
  a content scanner communicatively coupled with the client computer that receives and responds to the issued request to assess potential security risks of the at least a portion of the identified web content.

14. The system of claim 13, wherein the combined search and security results summary is dynamically generated according to user configuration information.

15. The system of claim 14, wherein the combined search and security results summary presents links to web content assessed to have potential security risks in a different color than links to web content assessed not to have potential security risks.

16. The system of claim 14, wherein the combined search and security results summary presents special icons adjacent to links to web content assessed to have potential security risks.

17. The system of claim 13, wherein the client computer filters web content assessed to have potential security risks from being included in the combined search and security results summary.

18. The system of claim 13, wherein web content comprises web pages.

19. The system of claim 13, wherein web content comprises media content, which includes at least one of the group consisting of an audio file comprising a song, an audio file comprising speech, an image file comprising a picture, a video file comprising a video clip, a video file comprising a movie, a file comprising an animation, a file comprising a presentation, and a file comprising a slide show.

20. A non-transitory computer-readable storage media storing program code for causing a computer device to:
  generate a search request with at least one designated search term;
  receive identifications of web content that includes the at least one designated search term;
  generate a search results summary that presents the identified web content;
  request assessments of at least a portion of the identified web content for potential security risks;
  receive assessed potential security risks for the at least a portion of the identified web content;
  dynamically generate a combined search and security results summary that presents the at least a portion of the identified web content, while some of the assessed potential security risks have not yet been received;
  dynamically update the combined search and security results summary, by presenting potential security risks of the presented web content, after the assessed potential security risks are received; and display a warning of potential risk, subsequent to presenting the at least a portion of the identified web content and prior to dynamically updating the combined search and security results summary.

21. A method for appending security information to search engine results, comprising:

issuing to a search engine a search request for web content having at least one designated search term;

receiving from the search engine search results identifying web content that includes the designated search term;

further receiving from the search engine an active program for requesting security assessments for the identified web content from a content scanner;

generating a search results summary that presents the identified web content;

executing the active program to request, from the content scanner, assessments of at least a portion of the identified web content for potential security risks;

receiving from the content scanner assessments of potential security risks of the at least a portion of the identified web content; and dynamically generating a combined search and security results summary comprising:

presenting the at least a portion of the identified web content, prior to completion of said receiving from the content scanner;

dynamically updating the combined search and security results summary, by presenting potential security risks of the presented web content, after the assessments of potential security risks are received; and displaying a warning of potential risk, subsequent to said presenting and prior to said dynamically updating.

* * * * *

UNITED STATES PATENT AND TRADEMARK OFFICE
CERTIFICATE OF CORRECTION

| | | |
|---|---|---|
| PATENT NO. | : 7,930,299 B2 | Page 1 of 1 |
| APPLICATION NO. | : 11/606663 | |
| DATED | : April 19, 2011 | |
| INVENTOR(S) | : Yuval Ben-Itzhak and Limor Elbaz | |

It is certified that error appears in the above-identified patent and that said Letters Patent is hereby corrected as shown below:

Title Page:

Item (75) Inventors, on the face of the patent, please change "Ben-Itzhak Yuval, Tel Aviv (IL); Elbaz Limor, New York, NY (US)" to -- Yuval Ben-Itzhak, Tel Aviv (IL); Limor Elbaz, New York, NY (US) --

Signed and Sealed this
Eighth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 7,930,299 B2  
APPLICATION NO. : 11/606663  
DATED : April 19, 2011  
INVENTOR(S) : Yuval Ben-Itzhak and Limor Elbaz Page 1 of 1

It is certified that error appears in the above-identified patent and that said Letters Patent is hereby corrected as shown below:

Title Page:

Item (12) "Yuval et al." should read -- Ben-Itzhak et al. --

Item (75) Inventors, on the face of the patent, please change "Ben-Itzhak Yuval, Tel Aviv (IL); Elbaz Limor, New York, NY (US)" to -- Yuval Ben-Itzhak, Tel Aviv (IL); Limor Elbaz, New York, NY (US) --

This certificate supersedes the Certificate of Correction issued July 8, 2014.

Signed and Sealed this  
Fifth Day of August, 2014

Michelle K. Lee  
*Deputy Director of the United States Patent and Trademark Office*